United States Patent
Yang et al.

(10) Patent No.: US 10,706,497 B1
(45) Date of Patent: Jul. 7, 2020

(54) HARDWARE BOOST METHOD AND HARDWARE BOOST SYSTEM

(71) Applicant: Wistron Corporation, New Taipei (TW)

(72) Inventors: Li-Yu Yang, New Taipei (TW);
Fang-Wen Liao, New Taipei (TW);
Ping-Hung Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/390,020

(22) Filed: Apr. 22, 2019

(30) Foreign Application Priority Data

Feb. 1, 2019 (TW) .............................. 108104128 A

(51) Int. Cl.
*G06T 1/20* (2006.01)
*G06F 1/26* (2006.01)
*G06F 1/08* (2006.01)
*G06F 9/50* (2006.01)

(52) U.S. Cl.
CPC ................. *G06T 1/20* (2013.01); *G06F 1/08* (2013.01); *G06F 1/26* (2013.01); *G06F 9/5027* (2013.01)

(58) Field of Classification Search
CPC ..... G06T 1/20; G06F 1/08; G06F 1/26; G06F 9/5027
USPC ......................................................... 345/501
See application file for complete search history.

(56) References Cited

U.S. PATENT DOCUMENTS

| | | | |
|---|---|---|---|
| 7,382,366 B1* | 6/2008 | Klock ..................... | G06F 1/206 345/213 |
| 2014/0136823 A1* | 5/2014 | Ragland .............. | G06F 9/44505 713/1 |
| 2014/0204101 A1* | 7/2014 | Ramadoss ................. | G06T 1/20 345/522 |
| 2017/0262955 A1* | 9/2017 | Lin .......................... | G09G 5/00 |
| 2018/0095522 A1* | 4/2018 | Huang ................ | G06F 11/3442 |
| 2019/0391898 A1* | 12/2019 | Vichare ................... | A63F 13/73 |

* cited by examiner

*Primary Examiner* — Jacinta M Crawford
(74) *Attorney, Agent, or Firm* — JCIPRNET

(57) ABSTRACT

A hardware boost method and a hardware boost system are provided. The hardware boost method includes: initializing a status table, wherein the status table includes multiple statuses, each of the statuses corresponds to a first action and a second action, and each of the statuses includes FPS information; and in each episode: determining that a system status belongs to a first status among the statuses; executing one of the first action and the second action according to a value corresponding to the first status and the first action and a value corresponding to the first status and the second action to enter a second status among the statuses and obtain a reward value; and refreshing the value corresponding to the first status and the one of the first action and the second action according to the reward value.

12 Claims, 5 Drawing Sheets

| S0 | S1 | S2 | S3 | S4 | S5 |
|----|----|----|----|----|----|
| –  | –  | –  | 0  | –  | –  |

|    | A1  | A2  |
|----|-----|-----|
| S0 | 0.0 | 0.0 |
| S1 | 0.0 | 0.0 |
| S2 | 0.0 | 0.0 |
| S3 | 0.0 | 0.0  ← 330 |
| S4 | 0.0 | 0.0 |
| S5 | 0.0 | 0.0 |

FIG. 3A

| S0 | S1 | S2 | S3 | S4 | S5 |
|----|----|----|----|----|----|
| –  | –  | –  | –  | 0  | –  |

|    | A1  | A2  |
|----|-----|-----|
| S0 | 0.0 | 0.0 |
| S1 | 0.0 | 0.0 |
| S2 | 0.0 | 0.0 |
| S3 | 0.0 | 0.0 |
| S4 | 0.0 | 0.2  ← 340 |
| S5 | 0.0 | 0.0 |

FIG. 3B

| S0 | S1 | S2 | S3 | S4 | S5 |
|----|----|----|----|----|----|
| –  | –  | –  | –  | –  | 0  |

FIG. 3C

| S0 | S1 | S2 | S3 | S4 | S5 |
|---|---|---|---|---|---|
| – | – | – | 0 | – | – |

|    | A1  | A2  |
|----|-----|-----|
| S0 | 0.0 | 0.0 |
| S1 | 0.0 | 0.0 |
| S2 | 0.0 | 0.0 |
| S3 | 0.0 | 0.0 — 331 |
| S4 | 0.0 | 0.2 |
| S5 | 0.0 | 0.0 |

FIG. 3D

| S0 | S1 | S2 | S3 | S4 | S5 |
|---|---|---|---|---|---|
| – | – | 0 | – | – | – |

|    | A1  | A2  |
|----|-----|-----|
| S0 | 0.0 | 0.0 |
| S1 | 0.0 | 0.0 |
| S2 | 0.0 | 0.0 — 320 |
| S3 | 0.0 | 0.0 |
| S4 | 0.0 | 0.2 |
| S5 | 0.0 | 0.0 |

FIG. 3E

| S0 | S1 | S2 | S3 | S4 | S5 |
|---|---|---|---|---|---|
| – | – | – | 0 | – | – |

|    | A1  | A2    |
|----|-----|-------|
| S0 | 0.0 | 0.0   |
| S1 | 0.0 | 0.0   |
| S2 | 0.0 | 0.0   |
| S3 | 0.0 | 0.036 — 330 |
| S4 | 0.0 | 0.2   |
| S5 | 0.0 | 0.0   |

FIG. 3F

| S0 | S1 | S2 | S3 | S4 | S5 |
|---|---|---|---|---|---|
| – | – | – | – | 0 | – |

|    | A1  | A2    |
|----|-----|-------|
| S0 | 0.0 | 0.0   |
| S1 | 0.0 | 0.0   |
| S2 | 0.0 | 0.0   |
| S3 | 0.0 | 0.036 |
| S4 | 0.0 | 0.36 — 340 |
| S5 | 0.0 | 0.0   |

FIG. 3G

| S0 | S1 | S2 | S3 | S4 | S5 |
|---|---|---|---|---|---|
| – | – | – | – | – | 0 |

FIG. 3H

HARDWARE BOOST METHOD AND HARDWARE BOOST SYSTEM

CROSS-REFERENCE TO RELATED APPLICATION

This application claims the priority benefit of Taiwan application serial no. 108104128, filed on Feb. 1, 2019. The entirety of the above-mentioned patent application is hereby incorporated by reference herein and made a part of this specification.

BACKGROUND

Technical Field

The disclosure relates to a hardware boost method and a hardware boost system, and in particular, to a hardware boost method and a hardware boost system for more accurately executing hardware boost.

Description of Related Art

Nowadays most of the display cards are provided with hardware boost function so that the frame per second (FPS) of a scene (e.g., a 3D scene) in a game can be increased to improve the user experience. However, the thermal energy generated in the hardware boost process may cause the fan of the display card to run at a high speed, which may generate much noise and consume more power. Therefore, how to accurately control the hardware boost to allow the game image to run smoothly is one of the issues that those skilled in the art are working on.

SUMMARY

In view of the above, the disclosure provides a hardware boost method and a hardware boost system that can execute hardware boost more accurately.

The disclosure provides a hardware boost method including the following steps. A status table is initialized, wherein the status table includes multiple statuses, each of the statuses corresponds to a first action and a second action, and each of the statuses includes FPS information. In each episode, it is determined that a system status belongs to a first status among the statuses; one of the first action and the second action is executed according to a value corresponding to the first status and the first action and a value corresponding to the first status and the second action to enter a second status among the statuses and obtain a reward value; and the value corresponding to the first status and the one of the first action and the second action is refreshed according to the reward value.

The disclosure provides a hardware boost system including a processor and a GPU coupled to the processor. The processor initializes a status table, wherein the status table includes multiple statuses, each of the statuses corresponds to a first action and a second action, and each of the statuses includes FPS information. In each episode, the processor determines that a system status belongs to a first status among the statuses; the processor executes one of the first action and the second action according to a value corresponding to the first status and the first action and a value corresponding to the first status and the second action to enter a second status among the statuses and obtain a reward value; and the processor refreshes the value corresponding to the first status and the one of the first action and the second action according to the reward value.

Based on the above, in the hardware boost method and the hardware boost system of the disclosure, a status table is initialized, and the status table includes multiple statuses and a first action and a second action corresponding to each of the statuses. In each episode, the processor determines that the system status belongs to a first status in the status table, and executes one of the first action and the second action according to the values of the first action and the second action corresponding to the first status to enter a second status and obtain a reward value. The processor then refreshes the value corresponding to the first status and the executed action according to the reward value.

To make the aforementioned more comprehensible, several embodiments accompanied with drawings are described in detail as follows.

BRIEF DESCRIPTION OF THE DRAWINGS

FIG. 3A to FIG. 3H show an example of a hardware boost method according to an embodiment of the disclosure.

DESCRIPTION OF THE EMBODIMENTS

Figure 1:
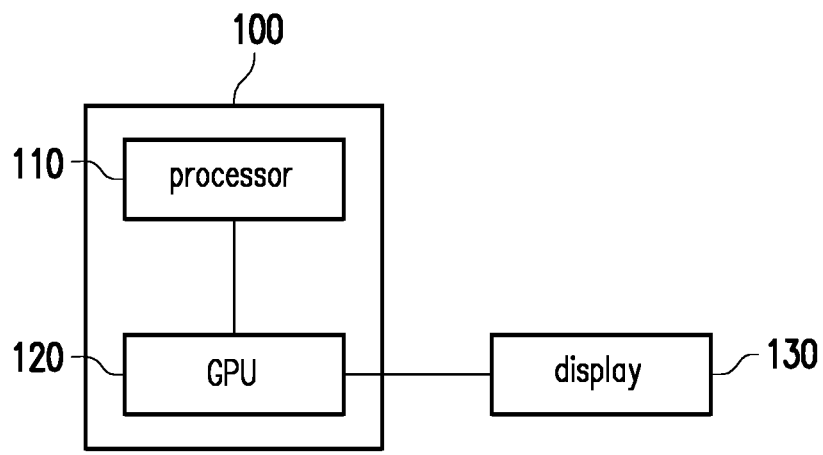
FIG. 1 is a block diagram of a hardware boost system according to an embodiment of the disclosure.

FIG. 1 is a block diagram of a hardware boost system according to an embodiment of the disclosure.

Referring to FIG. 1, a hardware boost system 100 of an embodiment of the disclosure includes a processor 110 and a GPU 120 coupled to the processor 110. The processor 110 is, for example, a central processing unit (CPU) or a similar device. The GPU 120 can process game/image contents and transmit an image to a display 130 in frames. When the frequency of the GPU 120 is higher, more frames can be transmitted to the display 130 in one second to generate a better visual effect for the user. In general, the FPS corresponding to the optimal visual effect is, for example, between 60 and 100. When the FPS is greater than 100, the user can hardly feel a smoother visual effect. In an embodiment, the GPU 120 may support hardware boost function (e.g., NVIDIA Boost APIs 3.0) to enhance the processing performance of the GPU 120 at a specific time point.

Figure 2:
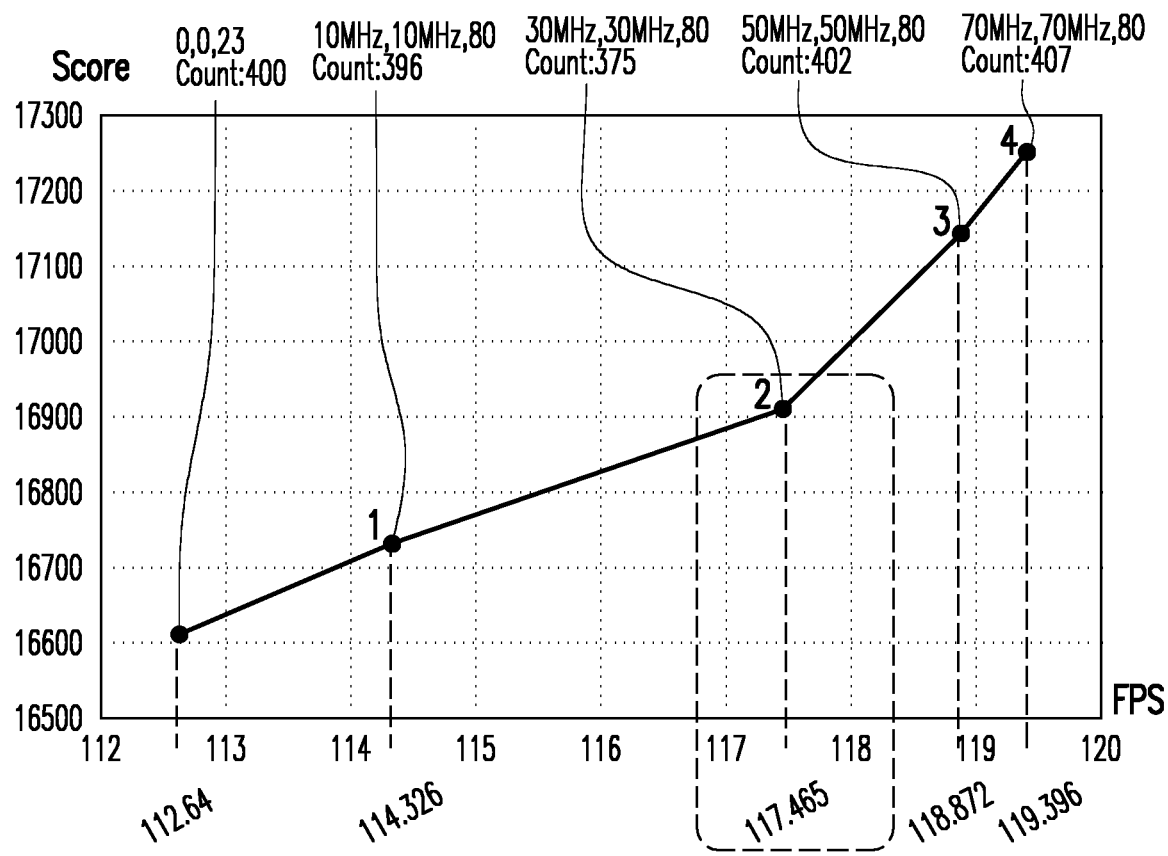
FIG. 2 is a schematic diagram of a hardware boost experiment according to an embodiment of the disclosure.

FIG. 2 is a schematic diagram of a hardware boost experiment according to an embodiment of the disclosure.

Referring to FIG. 2, the performance of the GPU 120 may be evaluated by benchmark software. In FIG. 2, "1", "2", "3", and "4" respectively represent the score and the FPS generated by overclocking the core and the video random access memory (VRAM) of the GPU 120 by 10 MHz, 30 MHz, 50 MHz, and 70 MHz. In an embodiment, $C=\Delta FPS/\Delta Score$ is defined, where $\Delta$ represents the result of overclocking minus the result of non-overclocking. It can be calculated from FIG. 2 that C1, C2, C3, and C4 corresponding to overclocking by 10 MHz, 30 MHz, 50 MHz, and 70 MHz are approximately equal to 0.013, 0.016, 0.011, and 0.012, respectively. Therefore, from the hardware boost experiment of FIG. 2, it can be learned that, to improve the FPS, overclocking by 30 MHz is more efficient than overclocking by 10 MHz, 50 MHz, or 70 MHz.

The following is a pseudo code of a hardware boost method according to an embodiment of the disclosure:

[Pseudo code]
Initialize Q(S, A)
Repeat (for each episode)
   Initialize S
   Repeat (for each step of episode)
   Choose A from S using policy derived from Q
   Take action A, observe R, S'
   Q(S, A)←(1−α)*Q(S,A)+α*[R+γ*maxQ(S', A)]
   S←S'
   Until S is terminal
Until all episodes completed Table 1 shows an example of initializing a status table Q(S, A).

TABLE 1

| Q (S, A) | A1 | A2 |
|---|---|---|
| S0 (FPS < 30) | 0 | 0 |
| S1 (FPS = 30~40) | 0 | 0 |
| S2 (FPS = 40~50) | 0 | 0 |
| S3 (FPS = 50~60) | 0 | 0 |
| S4 (FPS = 60~100) | 0 | 0 |
| S5 (FPS > 100) | 0 | 0 |

Referring to the above pseudo code and Table 1, "A1" represents non-boost and "A2" represents boost, i.e., overclocking the GPU 120. In an embodiment, the system may inject a specific application programming interface (API) into a game application to obtain the FPS of the game. For example, "SetWindowsHookEx" and "EndScene" of "Hook" may be used to insert the API into the game application to obtain the FPS of the game.

"episode" represents the set number of episodes (e.g., 10 episodes).

"Initialize S" represents, at the beginning of each episode, fetching an initial status and mapping the initial status to the corresponding S (S0 to S5), i.e., a first status.

"Until S is terminal" represents setting an end condition for the training of an episode. In an embodiment, the end condition may be set as entering the status S5 because there is no need to train a status having an FPS greater than 100. In another embodiment, the end condition may be set as a repetition count of one single status being greater than a predetermined count (e.g., one hundred), in case the system performance is insufficient for reaching the end condition. In another embodiment, the end condition may be set as entering the status S5 or the repetition count of one single status being greater than a predetermined count.

"Choose A from S" represents choosing the action that is expected to obtain a higher FPS. In an embodiment, the greedy percentage may be adopted. For example, the greedy percentage is 80%. When the reward value R is not present yet, one of A1 (i.e., a first action) and A2 (i.e., a second action) is randomly executed. When the reward value R is present, there is an 80% probability of executing one of A1 and A2 according to a value of the current status corresponding to A1 and a value of the current status corresponding to A2 (for example, when the value corresponding to A1 is greater than the value corresponding to A2, A1 is executed), and there is a 20% probability of randomly executing one of A1 and A2.

"Take action A, observe R, S'" represents applying the chosen A1 or A2 to the system. For example, when A2 is chosen, the system executes hardware boost and obtains a status S' (i.e., a second status) and the corresponding reward value R after the hardware boost. When the FPS of the status S' is in a predetermined FPS interval (e.g., FPS=60~100), the reward value R is a positive value (e.g., +1). When the FPS of the status S' is greater than the predetermined FPS interval, the reward value R is a negative value (e.g., −1). When the FPS of the status S' is less than the predetermined FPS interval, the processor 110 may further determine whether the FPS of the status S' is greater than the FPS of the status S. When the FPS of the status S' is greater than the FPS of the status S, the reward value R is a positive value (e.g., +1). When the FPS of status S' is not greater than the FPS of status S, the reward value R is zero. When the FPS is between 60 and 100, the user can feel a smoother visual effect. Therefore, when the FPS of status S' is in the predetermined FPS interval or approximates the predetermined FPS interval, the system gives a positive reward value. Conversely, when the FPS is greater than 100, the user can hardly feel a smoother visual effect, and at the same time, the system is likely to overheat. Therefore, when the FPS of the status S' is greater than the predetermined FPS interval, the system gives a negative reward value.

"α" represents the usage ratio of the learning value and may be, for example, 0.2.

"γ" represents the attenuation ratio of the reward value and may be, for example, 0.9.

After the reward value R is obtained, Q(S, A) can be refreshed according to the reward value R, α, and γ, and the refreshed value is filled in the corresponding field of the status table.

Although it is described in the example of Table 1 that the status S includes FPS information, the disclosure is not limited thereto. In another embodiment, status S may simultaneously include FPS information, GPU temperature information, and GPU usage rate information, and the above three types of information may have different weights.

FIG. 3A to FIG. 3H show an example of a hardware boost method according to an embodiment of the disclosure.

FIG. 3A to FIG. 3C include two repeat operations of the first episode, and FIG. 3D to FIG. 3H include four repeat operations of the second episode.

Referring to FIG. 3A, the initial FPS obtained in the system in this example is 55, so the system belongs to the status S3. In the first repetition of the first episode, the action A2 is chosen and the status S4 is entered. A value 330 corresponding to the status S3 and the action A2 is refreshed according to the reward value obtained upon entering the status S4 (i.e., refreshed to 0).

Referring to FIG. 3B, in the second repetition of the first episode, the action A2 is chosen and the status S5 is entered. A value 340 corresponding to the status S4 and the action A2 is refreshed according to the reward value obtained upon entering the status S5 (i.e., refreshed to 0.2).

Referring to FIG. 3C, when the status S5 is entered, the first episode is ended.

After the first episode is ended, the action is reset as non-boost, i.e., A1. At this time, the system still belongs to the status S3.

Referring to FIG. 3D, in the first repetition of the second episode, the action A1 is chosen and the status S2 is entered. A value 331 corresponding to the status S3 and the action A1 is refreshed according to the reward value obtained upon entering the status S2 (i.e., refreshed to 0).

Referring to FIG. 3E, in the second repetition of the second episode, the action A2 is chosen and the status S3 is entered. A value 320 corresponding to the status S2 and the action A2 is refreshed according to the reward value obtained upon entering the status S3 (i.e., refreshed to 0).

Referring to FIG. 3F, in the third repetition of the second episode, the action A2 is chosen and the status S4 is entered.

The value 330 corresponding to the status S3 and the action A2 is refreshed according to the reward value obtained upon entering the status S4 (i.e., refreshed to 0.036).

Referring to FIG. 3G, in the fourth repetition of the second episode, the action A2 is chosen and the status S5 is entered. The value 340 corresponding to the status S4 and the action A2 is refreshed according to the reward value obtained upon entering the status S5 (i.e., refreshed to 0.36).

Referring to FIG. 3H, when the status S5 is entered, the second episode is ended.

Through the operation of the multiple episodes, the values in the status table Q(S, A) can be constantly refreshed, so that the system can more accurately determine whether it is necessary to execute hardware boost in each of the statuses according to the values in the status table Q(S, A).

Figure 4:
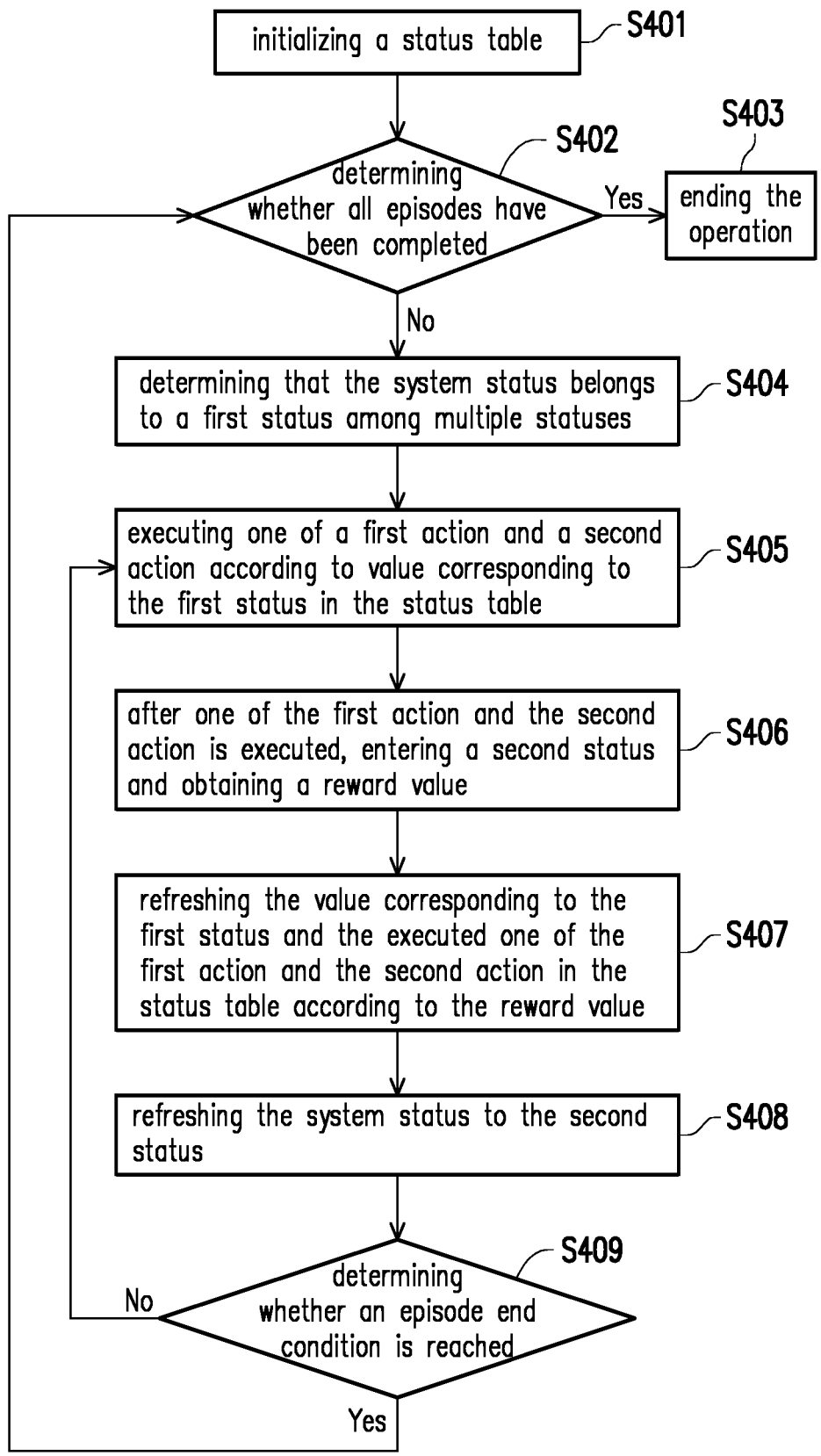
FIG. 4 is a flowchart of a hardware boost method according to an embodiment of the disclosure.

FIG. 4 is a flowchart of a hardware boost method according to an embodiment of the disclosure.

Referring to FIG. 4, in step S401, a status table is initialized.

In step S402, it is determined whether all episodes have been completed.

If all episodes have been completed, then in step S403, the operation is ended.

If all episodes have not been completed, in step S404, it is determined that the system status belongs to a first status among multiple statuses.

In step S405, one of a first action and a second action is executed according to values corresponding to the first status in the status table.

In step S406, after one of the first action and the second action is executed, a second status is entered and a reward value is obtained.

In step S407, the value corresponding to the first status and the executed one of the first action and the second action in the status table is refreshed according to the reward value.

In step S408, the system status is refreshed to the second status.

In step S409, it is determined whether an episode end condition is reached.

If the episode end condition has not been reached, returning to step S405.

If the episode end condition is reached, returning to step S402.

In summary of the above, in the hardware boost method and the hardware boost system of the disclosure, a status table is initialized, and the status table includes multiple statuses and a first action and a second action corresponding to each of the statuses. In each episode, the processor determines that the system status belongs to a first status in the status table, and executes one of the first action and the second action according to the values of the first action and the second action corresponding to the first status to enter a second status and obtain a reward value. The processor then refreshes the value corresponding to the first status and the executed action according to the reward value. By establishing the status table and refreshing the values in the status table in multiple episodes, the system can more accurately determine whether it is necessary to execute hardware boost in each of the statuses according to the values in the status table to provide a better user experience for the user.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A hardware boost method comprising:
   initializing a status table, wherein the status table comprises multiple statuses, each of the statuses corresponds to a first action and a second action, and each of the statuses comprises a frame per second (FPS) information; and
   in an episode:
   determining that a system status belongs to a first status among the statuses;
   executing one of the first action and the second action according to a value corresponding to the first status and the first action and a value corresponding to the first status and the second action to enter a second status among the statuses and obtain a reward value; and
   refreshing the value corresponding to the first status and the one of the first action and the second action according to the reward value,
   wherein when the FPS information of the second status is in a predetermined FPS interval, the reward value is a positive value, and when the FPS information of the second status is greater than the predetermined FPS interval, the reward value is a negative value,
   wherein when the FPS information of the second status is less than the predetermined FPS interval, it is determined whether the FPS information of the second status is greater than the FPS information of the first status, and when the FPS information of the second status is greater than the FPS information of the first status, the reward value is the positive value, and when the FPS information of the second status is not greater than the FPS information of the first status, the reward value is zero.

2. The hardware boost method according to claim 1, wherein the first action is non-execution of hardware boost, and the second action is execution of hardware boost, wherein the execution of hardware boost comprises overclocking a core of a graphic processing unit (GPU).

3. The hardware boost method according to claim 1, wherein when the reward value is not present yet, one of the first action and the second action is randomly executed.

4. The hardware boost method according to claim 1, wherein when the reward value is present, one of the first action and the second action is executed according to the value corresponding to the first status and the first action and the value corresponding to the first status and the second action, or one of the first action and the second action is randomly executed.

5. The hardware boost method according to claim 1, wherein when the FPS information of the second status is greater than a predetermined FPS interval, the episode is ended and a next episode is entered.

6. The hardware boost method according to claim 1, wherein each of the statuses further comprises GPU temperature information and GPU usage rate information.

7. A hardware boost system comprising:
   a processor; and
   a graphic processing unit (GPU) coupled to the processor, wherein the processor
   initializes a status table, wherein the status table comprises multiple statuses, each of the statuses corresponds to a first action and a second action, and each of the statuses comprises a frame per second (FPS) information; and
   in an episode:
   determines that a system status belongs to a first status among the statuses;

executes one of the first action and the second action according to a value corresponding to the first status and the first action and a value corresponding to the first status and the second action to enter a second status among the statuses and obtain a reward value; and refreshes the value corresponding to the first status and the one of the first action and the second action according to the reward value, wherein when the FPS information of the second status is in a predetermined FPS interval, the reward value is a positive value, and when the FPS information of the second status is greater than the predetermined FPS interval, the reward value is a negative value, wherein when the FPS information of the second status is less than the predetermined FPS interval, it is determined whether the FPS information of the second status is greater than the FPS information of the first status, and when the FPS information of the second status is greater than the FPS information of the first status, the reward value is the positive value, and when the FPS information of the second status is not greater than the FPS information of the first status, the reward value is zero.

8. The hardware boost system according to claim 7, wherein the first action is non-execution of hardware boost, and the second action is execution of hardware boost, wherein the execution of hardware boost comprises overclocking a core of the GPU.

9. The hardware boost system according to claim 7, wherein when the reward value is not present yet, one of the first action and the second action is randomly executed.

10. The hardware boost system according to claim 7, wherein when the reward value is present, one of the first action and the second action is executed according to the value corresponding to the first status and the first action and the value corresponding to the first status and the second action, or one of the first action and the second action is randomly executed.

11. The hardware boost system according to claim 7, wherein when the FPS information of the second status is greater than a predetermined FPS interval, the episode is ended and a next episode is entered.

12. The hardware boost system according to claim 7, wherein each of the statuses further comprises GPU temperature information and GPU usage rate information.

* * * * *